United States Patent
Ivey et al.

(10) Patent No.: US 9,807,485 B1
(45) Date of Patent: Oct. 31, 2017

(54) SLEEK CEILING SPEAKER SYSTEM

(71) Applicant: Mitek Corp., Inc., Phoenix, AZ (US)

(72) Inventors: Johnathan Ivey, Chandler, AZ (US); Kevin Sykes, Phoenix, AZ (US)

(73) Assignee: Mitek Corp., Inc., Phoenix, AZ (US)

( * ) Notice: Subject to any disclaimer, the term of this patent is extended or adjusted under 35 U.S.C. 154(b) by 0 days.

(21) Appl. No.: 15/238,246

(22) Filed: Aug. 16, 2016

(51) Int. Cl.
  *H04R 1/02* (2006.01)
  *H04R 1/34* (2006.01)
  *F21V 8/00* (2006.01)
  *F21V 21/14* (2006.01)
  *F21V 33/00* (2006.01)
  *F21S 8/04* (2006.01)

(52) U.S. Cl.
  CPC ............... *H04R 1/026* (2013.01); *F21S 8/04* (2013.01); *F21V 21/14* (2013.01); *F21V 33/0056* (2013.01); *G02B 6/0096* (2013.01); *H04R 1/023* (2013.01); *H04R 1/345* (2013.01); *H04R 2201/021* (2013.01); *H04R 2430/01* (2013.01)

(58) Field of Classification Search
  None
  See application file for complete search history.

(56) References Cited

U.S. PATENT DOCUMENTS

| | | | |
|---|---|---|---|
| 2008/0143495 A1* | 6/2008 | Haase | F21K 9/00 340/326 |
| 2011/0317861 A1* | 12/2011 | Haase | F21V 33/0056 381/333 |
| 2012/0002835 A1* | 1/2012 | Stewart, Jr. | H04R 1/025 381/386 |

* cited by examiner

*Primary Examiner* — Paul Huber
(74) *Attorney, Agent, or Firm* — Keith L. Jenkins, Registered Patent Attorney, LLC; Keith L. Jenkins

(57) ABSTRACT

A sleek ceiling speaker having an annular magnetic assembly and annular dust cap through which extends an elongated actuator, which may also be a light pipe. The elongated actuator supports a variable transformer tap which is manually operated by rotating a bottom end of the elongated actuator which is expanded into a sound disperser plug. Changing the transformer tap changes the volume produced by the speaker. The elongated actuator may also support an LED board that provides light to the light pipe and to the transparent or translucent sound disperser plug. Rotating the elongated actuator may also be used to change the lighting. The housing is secured to a ceiling tile by attaching a releasably attachable outwardly extending circumferential flange to a sound funnel that supports the sound disperser.

20 Claims, 9 Drawing Sheets

SLEEK CEILING SPEAKER SYSTEM

FIELD OF ART

The present invention relates to ceiling speakers with a very low profile below the ceiling and wide sound dispersion. The present invention further relates to sleek ceiling speakers that may have local manual volume control via a variable power tap and that may also provide manually controllable illumination.

BACKGROUND OF THE INVENTION

Suspended ceilings consisting of a grid framework within which ceiling tiles may be supported are well known. Mounting loudspeakers on the top side of a ceiling tile or specialized tile designed to support a loudspeaker, with an opening in the tile for allowing the sound into the room below the tile, is also known. Many ceiling speaker installations are vast, sometimes providing sound to an entire floor or floors of a modern building to provide enunciator services, emergency alerts, and background music, are controlled as a whole, so that small areas where softer music or louder music is desired have no recourse. In the same way, ceiling lighting is generally not locally controlled in large rooms. Ceiling speakers with large grills and grill frames can interrupt an attractive ceiling pattern. What is needed is a ceiling speaker that can be locally controlled as to volume, can be locally controlled as to light emission, has a small visual footprint on the ceiling, and provides wide sound dispersion.

SUMMARY OF THE INVENTION

Briefly described, the invention includes a sleek ceiling speaker that can be locally controlled as to volume, can be locally controlled as to light emission, has a small visual footprint on the ceiling, and provides wide sound dispersion.

In an embodiment, the sleek ceiling speaker system includes: a housing having: a speaker baffle having a baffle opening for receiving an output end of a speaker; and a bottom opening for receiving an end of a sound funnel; the speaker coupled to a top of the sound baffle around the baffle opening; and the sound funnel: having an upper end coupled to a bottom of the sound baffle around the baffle opening; and having a lower cylindrical portion extending through the bottom opening; and an elongated actuator originating from above the speaker and extending through the speaker, through the speaker baffle, into the sound funnel, and terminating in a sound disperser plug. That sleek ceiling speaker system, including a sound disperser fixed to the lower cylindrical portion of the sound funnel, where the sound disperser is adapted to disperse sound radially outwardly over at least 180° around a center of the sound disperser. That sleek ceiling speaker system, including an LED board supported on the elongated actuator. That sleek ceiling speaker system, where the elongated actuator includes a light pipe adapted to receive light from the LED board. That sleek ceiling speaker system, where the LED board is responsive to an axial rotational position of the elongated actuator to determine the light received by the light pipe. That sleek ceiling speaker system, where the sound disperser plug includes one of a transparent plug and a translucent plug. That sleek ceiling speaker system, where the sound disperser plug includes a tactile enhancement on a surface thereof. That sleek ceiling speaker system, including: a transformer supported on the sound baffle and/or the housing; and a variable transformer tap supported on the elongated actuator and responsive to axial rotation of the elongated actuator to change the volume of sound produced by the speaker during operation. That sleek ceiling speaker system, where the speaker includes an open-centered magnetic assembly. That sleek ceiling speaker system, where the speaker includes an open-centered dust cap. That sleek ceiling speaker system, including a releasably attachable outwardly extending circumferential flange adapted to fasten to a bottom end of the sound funnel. That sleek ceiling speaker system, including a ceiling tile clamped between the releasably attachable outwardly extending circumferential flange and a bottom surface of the housing.

In an embodiment, the sleek ceiling speaker system includes: a housing having: a speaker baffle having a baffle opening for receiving an output end of a speaker; and a bottom opening for receiving an end of a sound funnel; the speaker coupled to a top of the sound baffle around the baffle opening; and the sound funnel: having an upper end coupled to a bottom of the sound baffle around the baffle opening; and having a lower cylindrical portion extending through the bottom opening; an elongated actuator originating from above the speaker and extending through the speaker, through the speaker baffle, into the sound funnel, and terminating in a sound disperser plug; and a sound disperser fixed to the lower cylindrical portion of the sound funnel, where the sound disperser is adapted to disperse sound radially outwardly over 180° around a center of the sound disperser. That sleek ceiling speaker system, including: an LED board supported on the elongated actuator; where the elongated actuator includes a light pipe adapted to receive light from the LED board; the LED board is responsive to an axial rotational position of the elongated actuator to determine the light received by the light pipe; and the sound disperser plug includes one of a transparent plug and a translucent plug. That sleek ceiling speaker system, where the sound disperser plug includes a tactile enhancement on a bottom surface thereof. That sleek ceiling speaker system, including: a transformer supported on the sound baffle and/or the housing; and a variable transformer tap supported on the elongated actuator and responsive to axial rotation of the elongated actuator to change the volume of sound produced by the speaker during operation. That sleek ceiling speaker system, where the speaker includes: an open-centered magnetic assembly; and an open-centered dust cap. That sleek ceiling speaker system, including: a releasably attachable outwardly extending circumferential flange adapted to fasten to a bottom end of the sound funnel.

In an embodiment, the sleek ceiling speaker system includes: a housing having: a speaker baffle having a baffle opening for receiving an output end of a speaker; and a bottom opening for receiving an end of a sound funnel; the speaker coupled to a top of the sound baffle around the baffle opening; and the sound funnel: having an upper end coupled to a bottom of the sound baffle around the baffle opening; and having a lower cylindrical portion extending through the bottom opening; an elongated actuator originating from above the speaker and extending through the speaker, through the speaker baffle, into the sound funnel, and terminating in a sound disperser plug; a sound disperser fixed to the lower cylindrical portion of the sound funnel, where the sound disperser is adapted to disperse sound radially outwardly over at least 180° around a center of the sound disperser; a transformer supported on the sound baffle and/or the housing; a variable transformer tap supported on the elongated actuator and responsive to axial rotation of the elongated actuator to change the volume of sound produced by the speaker during operation; an open-centered magnetic assembly; an open-centered dust cap; a tactile enhancement on a bottom surface of the sound disperser plug a releasably attachable outwardly extending circumferential flange adapted to fasten to a bottom end of the sound funnel. That sleek ceiling speaker system, including: an LED board supported on the elongated actuator; where the elongated actuator includes a light pipe adapted to receive light from the LED board; the LED board is responsive to an axial rotational position of the elongated actuator to determine the light received by the light pipe; and the sound disperser plug includes one of a transparent plug and a translucent plug.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

Figure 1:
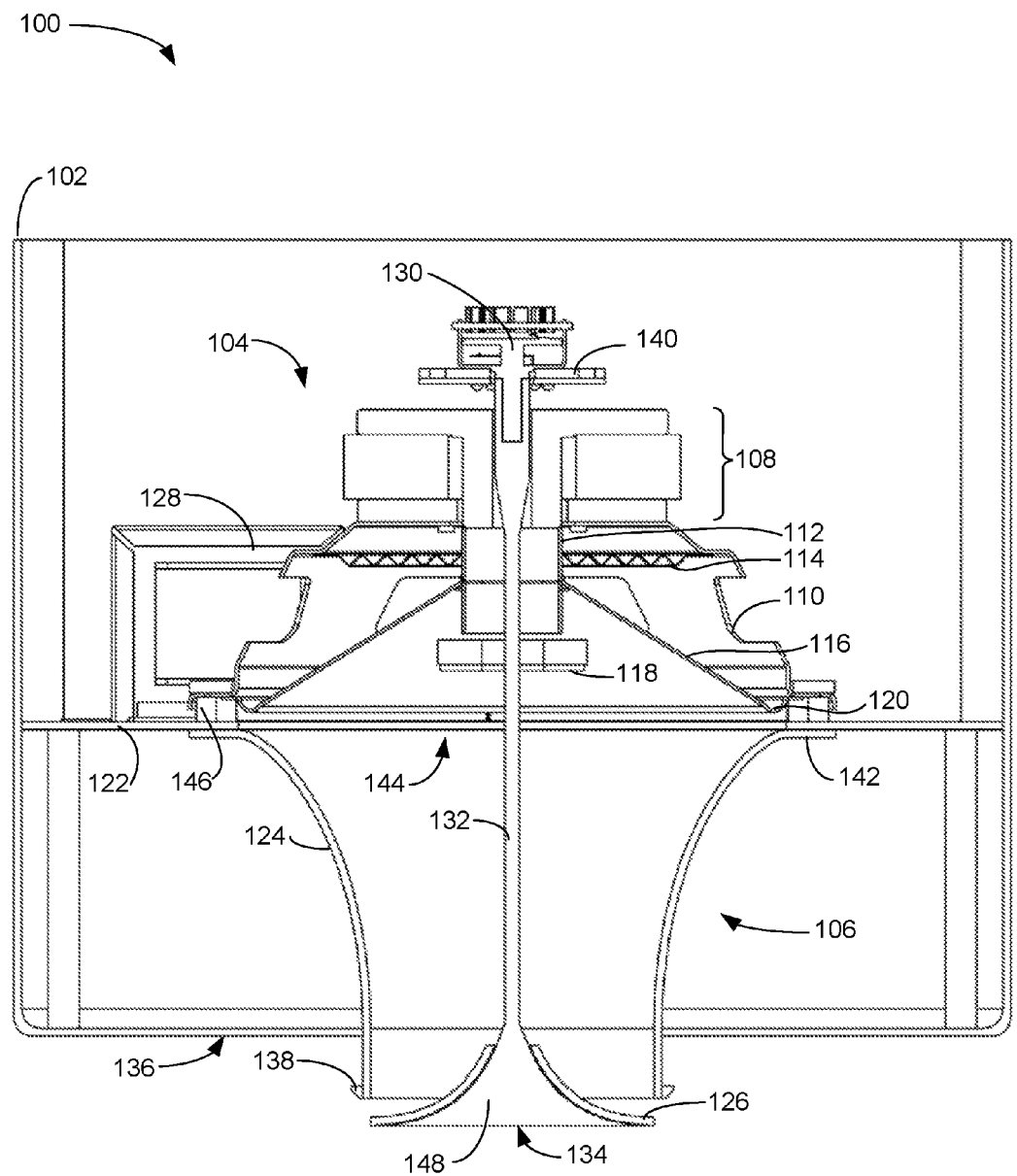
FIG. 1 is cross-sectional elevation view illustrating an exemplary embodiment of the sleek ceiling speaker system, according to a preferred embodiment of the present invention.

FIG. 1 is cross-sectional elevation view illustrating an exemplary embodiment of the sleek ceiling speaker system 100, according to a preferred embodiment of the present invention. Sleek ceiling speaker system 100 includes housing 102, speaker baffle 122 preferably extending to all sides of housing 102, sound control assembly 106, and actuator 132. Housing 102 is shown as generally rectangular in the illustrations, but the invention is not so limited. Preferably, housing 102 is made of a lightweight material that has some sound deadening properties. Housing 102 preferably has closed top panel 602 (see FIG. 6). In a particular embodiment, a housing of metal, or similarly functional material, may be used. Speaker baffle 102 extends inwardly from all sides of the housing 102 to an opening 144 that accommodates the output of speaker 104.

Speaker 104 is supported by speaker baffle 122. Transformer 128 is supported on the speaker baffle 122 and may be additionally supported by the housing 102. In a particular embodiment, the transformer 128 may be entirely supported by the housing 102. Speaker 104 includes annular magnetic assembly 108 attached to basket 110 which supports diaphragm 116 via surround 120. Diaphragm 116 supports the voice coil 112, which is limited to vertical motion by spider 114 that is mounted to the basket 110. The basket 110 is secured to the speaker baffle 122 via vibration suppressors 146. Annular dust cover 118 is supported by the former for the voice coil 112. Except for the annular magnet assembly 108 and the annular dust cap 118, speaker 104 is mundane. Those of skill in the art, enlightened by this disclosure, will appreciate the wide variety of speaker designs that may be modified to provide open-centered magnet assemblies and open-centered dust caps, all of which are within the scope of the present invention.

Sound control assembly 106 includes sound funnel 124, which is preferably a shell with rotational symmetry that is coupled to the underside of speaker baffle 122 via top circumferential flange 142. Sound funnel 124 terminates below the bottom surface 136 of housing 102. At its lowest extent, sound funnel 124 has a releasably attachable outwardly extending circumferential flange 138. The space between the bottom housing surface 136 and the sound funnel circumferential flange 138 receives a ceiling tile 402 (see FIG. 4). Sound disperser 126 is preferably also a shell with rotational symmetry. In a particular embodiment, a differently shaped sound disperser may be used. Sound is preferably emitted in a substantially 180° or wider pattern between the bottom of the sound funnel 124 and the sound disperser 126.

Actuator 132 is preferably a light pipe for conducting light from an LED board 140 to a sound disperser plug 148 and thence out into the room below the ceiling. LED board 140 is an electronic circuit board having LEDs and lighting controls. Actuator 132 extends downward from above the magnetic assembly 108, though the opening in the center of the magnetic assembly 108, through the cylindrical shell former on which the voice coil 112 is wound, through the opening in the annular dust cap 118, through the opening 144 in the speaker baffle 122, through the sound funnel 124, and toward the sound disperser 126 to the sound disperser plug 148, as shown. Actuator 132 is preferably made of a solid, light-conducting material. Actuator 132 may be transparent or translucent. Sound disperser plug is also preferably made of the same light-conducting material. In a particular embodiment, actuator 132 may be hollow. The LED lighting may be of a constant color and brightness. In some embodiments, the lighting may be changed in brightness and/or color by manual adjustment of the actuator 132 via the sound disperser plug 148. In some embodiments, the LED board 140 may be omitted.

Sound disperser plug 148 is flared conformally to the sound disperser 126, as shown. The underside 134 of sound disperser plug 148 is a closed surface and may, in a particular embodiment, have tactile enhancements 502 (see FIG. 5). Actuator 132 may be manually rotated via the sound disperser plug 148 to select a particular position of the transformer tap 130 in order to change the output sound volume. In a particular embodiment, manual rotation of the sound disperser plug 148 will change the transformer tap 130, the LED brightness, and the LED color concurrently. In another particular embodiment, manual rotation of the sound disperser plug 148 will change the transformer tap 130 and the LED brightness. In a particular embodiment, manual rotation of the sound disperser plug 148 will change the transformer tap 130 and the LED color concurrently.

Figure 2:
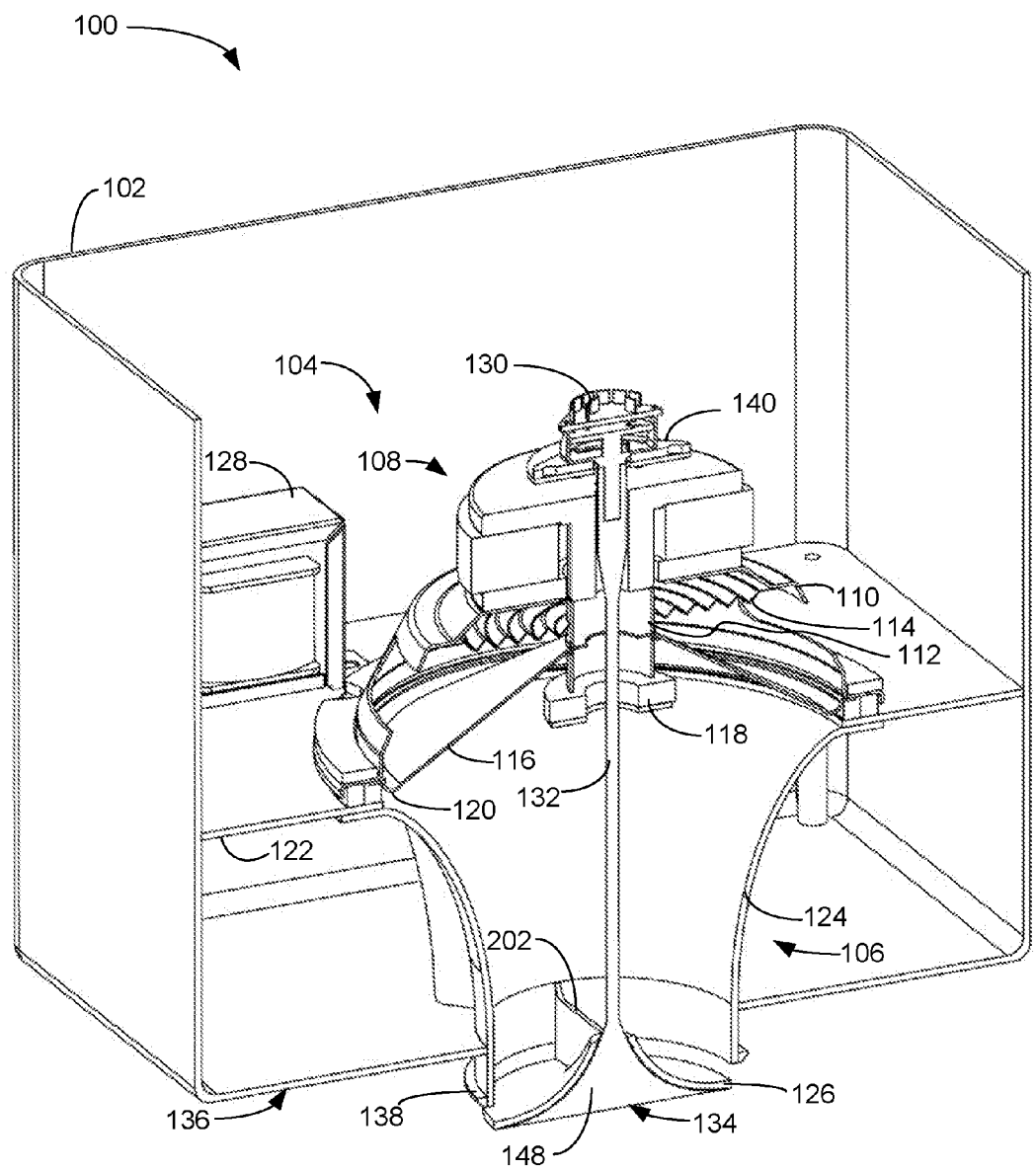
FIG. 2 is a top-front perspective cutaway view illustrating the exemplary embodiment of the sleek ceiling speaker system of FIG. 1, according to a preferred embodiment of the present invention.

FIG. 2 is a top-front perspective cutaway view illustrating an exemplary embodiment of the sleek ceiling speaker system 100 of FIG. 1, according to a preferred embodiment of the present invention. Fin 202 fixes sound disperser 126 to sound funnel 124. In a particular embodiment, there may be more than one fin 202 securing sound disperser 126 to sound funnel 124. Preferably, fin 202 is sufficiently thin to avoid noticeable disturbance of the 180° (or greater) sound distribution pattern. Sound disperser plug 148 is rotatable relative to the sound disperser 126.

Figure 3:
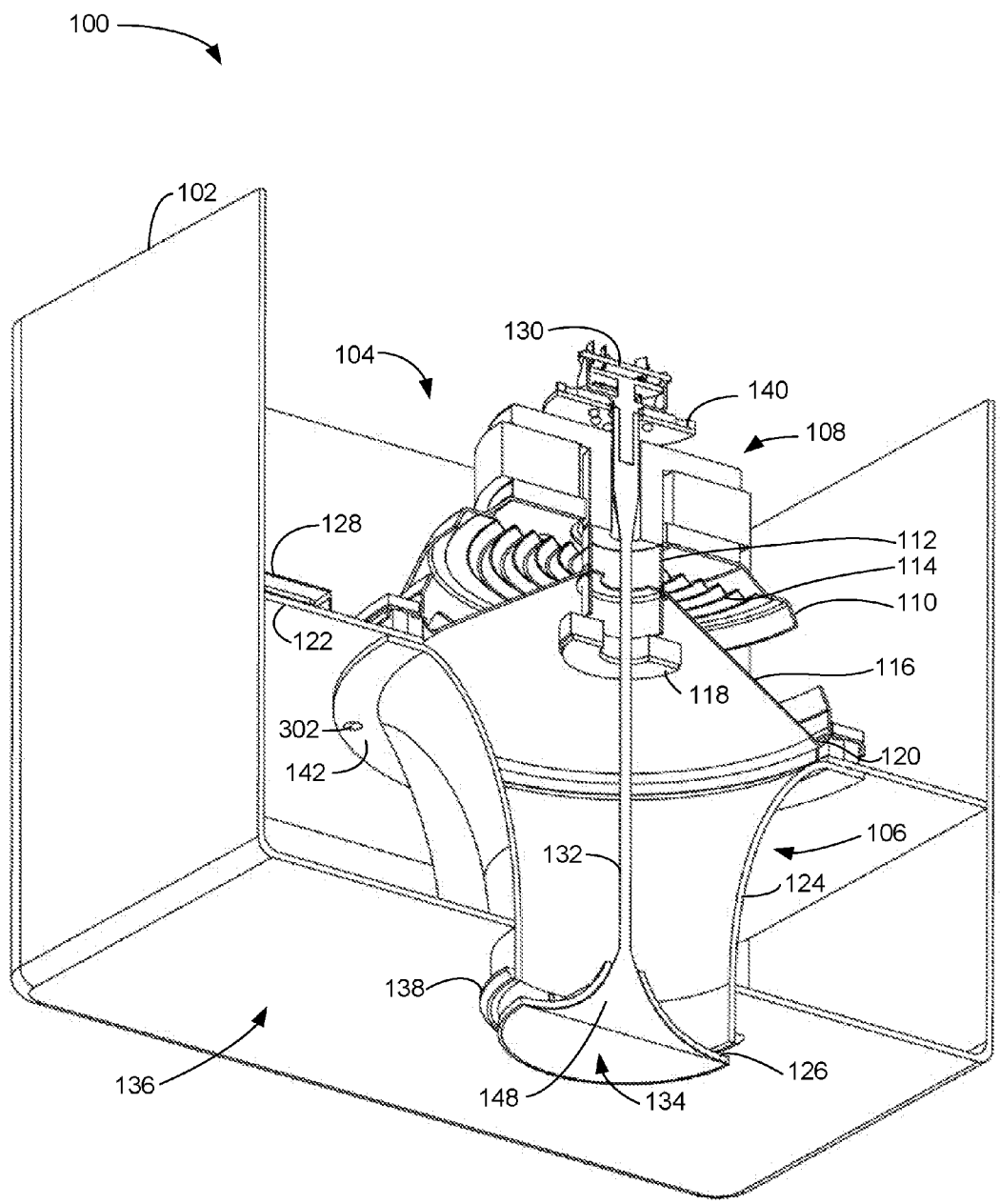
FIG. 3 is a bottom front perspective cutaway view illustrating the exemplary embodiment of the sleek ceiling speaker system of FIG. 1, according to a preferred embodiment of the present invention.

FIG. 3 is a bottom front perspective cutaway view illustrating an exemplary embodiment of the sleek ceiling speaker system 100 of FIG. 1, according to a preferred embodiment of the present invention. Top circumferential flange 142 preferably has fastener openings 302 to assist in connecting the sound funnel 124 to the underside of sound baffle 122. In the present embodiment, top circumferential flange 142 preferably has a plurality of fastener openings 302.

Figure 4:
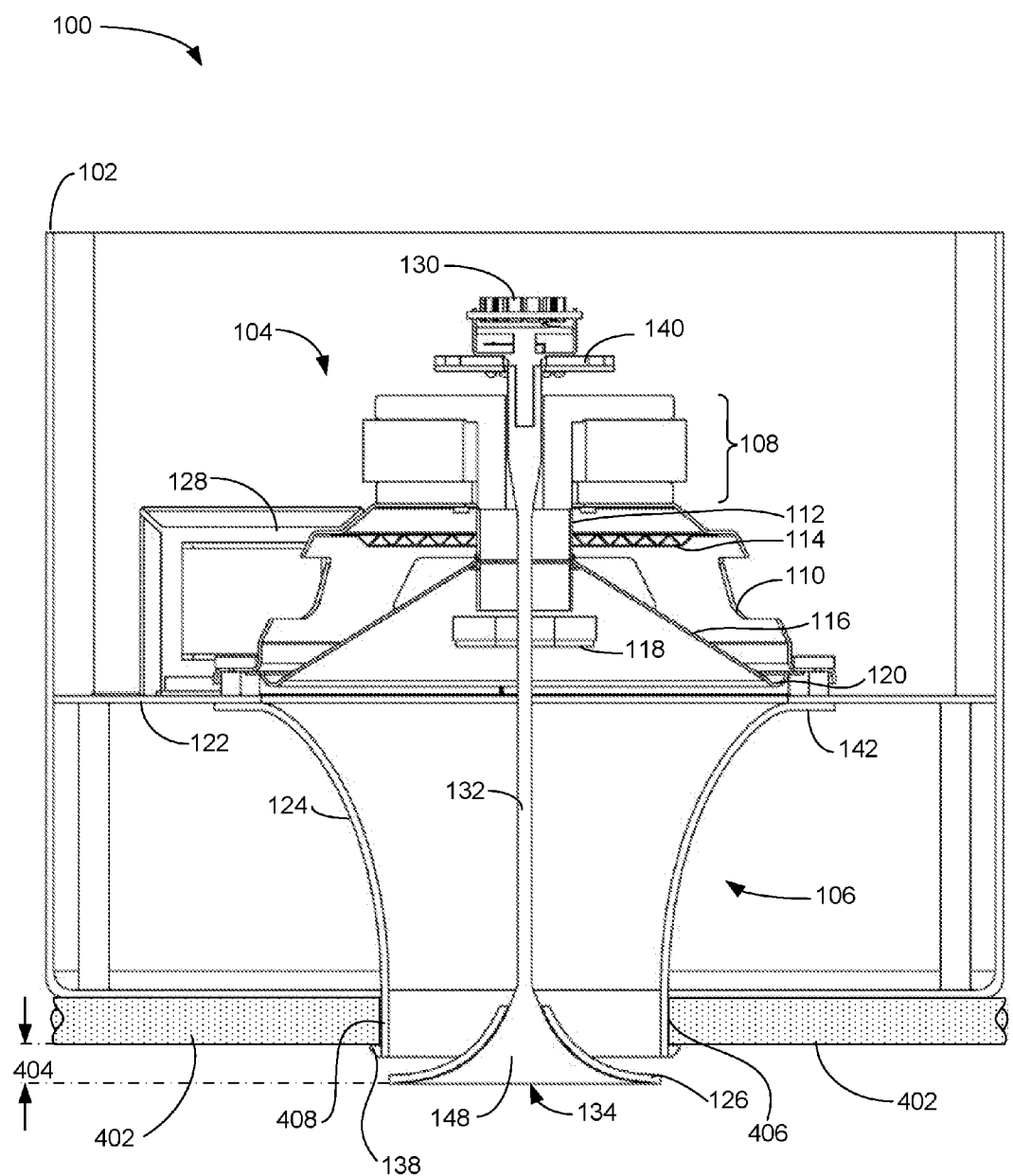
FIG. 4 is cross-sectional elevation view illustrating the exemplary embodiment of the sleek ceiling speaker system of FIG. 1 and showing a partial ceiling tile, according to a preferred embodiment of the present invention.

FIG. 4 is cross-sectional elevation view illustrating an exemplary embodiment of the sleek ceiling speaker system 100 of FIG. 1 and showing a partial ceiling tile 402, according to a preferred embodiment of the present invention. In a particular embodiment, the sleek ceiling speaker system 100 may be sold attached to the ceiling tile 402, as shown. In other embodiments, the sleek ceiling speaker system 100 may be sold without the ceiling tile 402. An advantage of the present invention, is that 180° (or greater) sound dispersion is accomplished with very narrow extension 404 below the ceiling tile 402. Ceiling tile 402 may be any commercial ceiling tile 402 with enough strength to support the sleek ceiling speaker system 100. In some embodiments, ceiling tile 402 is custom made to support the sleek ceiling speaker system 100.

Releasably attachable outwardly extending circumferential flange 138, the sound funnel 124, the sound disperser 126 and/or the sound disperser plug 148 may be color and/or texture coordinated with the ceiling tile 402.

In installation, a hole 406 is made in ceiling tile 402 having a diameter for receiving a bottom cylindrical portion 408 of the sound funnel 124 without the releasably attachable outwardly extending circumferential flange 138 attached. The bottom cylindrical portion 408 of the sound funnel 124 is inserted into the hole 406 until the bottom surface 136 of the housing 102 abuts the top surface of the ceiling tile 402. The releasably attachable outwardly extending circumferential flange 138 is then attached, for non-limiting example, by screwing onto complimentary threads between the bottom cylindrical portion 408 and the releasably attachable outwardly extending circumferential flange 138. The ceiling tile 402 and attached sleek ceiling speaker system 100 may then be installed in a suspended ceiling grid.

In operation, audio signal wires are connected to the transformer 128 which increases the signal power to speaker 104, which produces sound that is ultimately emitted between the sound disperser 126 and the releasably attachable outwardly extending circumferential flange 138. Manual rotation of the sound disperser plug 148 can be used to control the sound volume and the lighting. A further advantage of the present invention is that the broad underside 136 of the housing 102 enables secure installation with the releasably attachable outwardly extending circumferential flange 138, providing simple and rapid installation. For use on a wall installation, a stronger tile is generally required.

Figure 5:
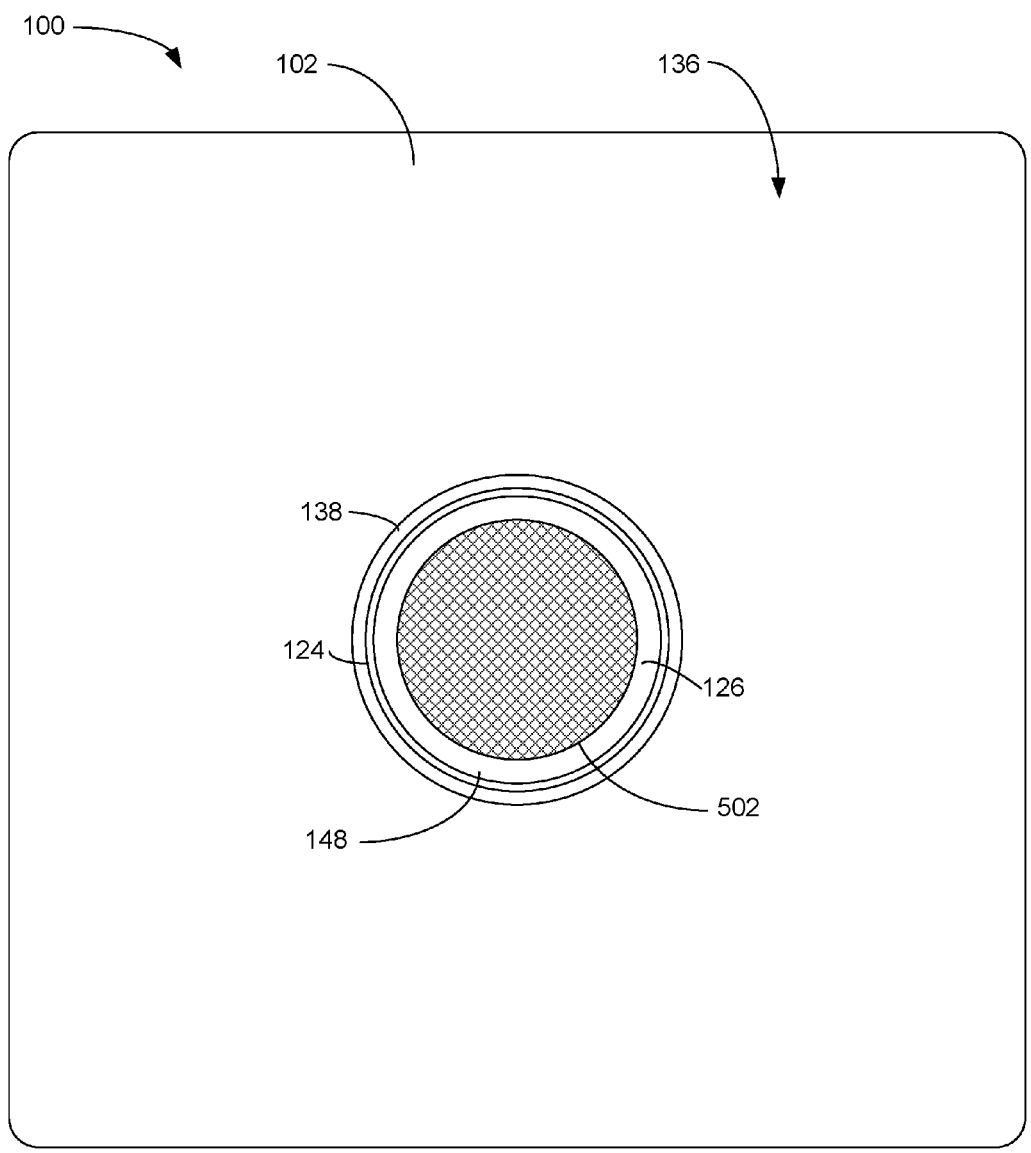
FIG. 5 is a bottom plan view illustrating an exemplary embodiment of the sleek ceiling speaker system of FIG. 1, according to a preferred embodiment of the present invention.

FIG. 5 is a bottom plan view illustrating an exemplary embodiment of the sleek ceiling speaker system 100 of FIG. 1, according to a preferred embodiment of the present invention. Sound disperser plug 148 is shown with tactile enhancements 502 for those embodiments that use rotational motion of the actuator 132 to control the volume and/or the lighting. Tactile enhancement 502 is preferably a roughened surface. In other embodiments, depressions into the sound disperser plug 148, adapted to receive a human finger or fingers, or a tool, for rotating the sound disperser plug 148 may be used. Those of skill in the art, enlightened by the present disclosure, will see various other approaches to making tactile enhancements 502 to ease the use of the volume control and/or lighting controls of the present invention.

Figure 6:
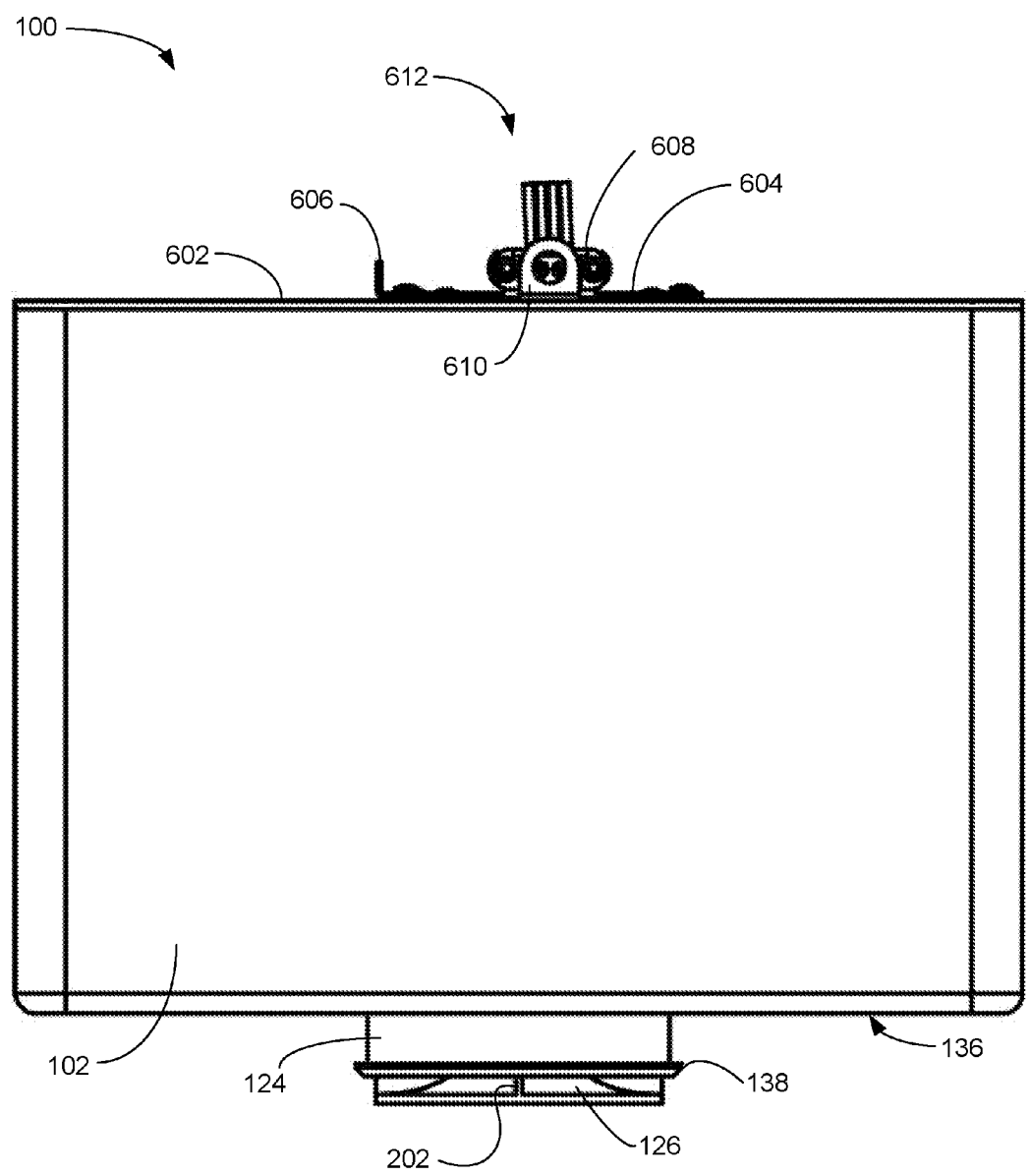
FIG. 6 is a side elevation wire frame view illustrating the exemplary embodiment of the sleek ceiling speaker system of FIG. 1, according to a preferred embodiment of the present invention.

FIG. 6 is a side elevation wire frame view illustrating the exemplary embodiment of the sleek ceiling speaker system 100 of FIG. 1, according to a preferred embodiment of the present invention. FIG. 6 illustrates the external appearance of sleek ceiling speaker system 100, with wire frame lines indicating curved edges. Top panel 602 closes off the top of housing 102 and supports connector assembly 612. Connector assembly 612 includes access plate 604 having upward flange 606 and connector plate 806 (see FIG. 8) having cable tie anchor 610 and electrical connector 608 for receiving at least audio signal wires. Additional views of the sound disperser 126 and sound funnel 124 are provided.

Figure 7:
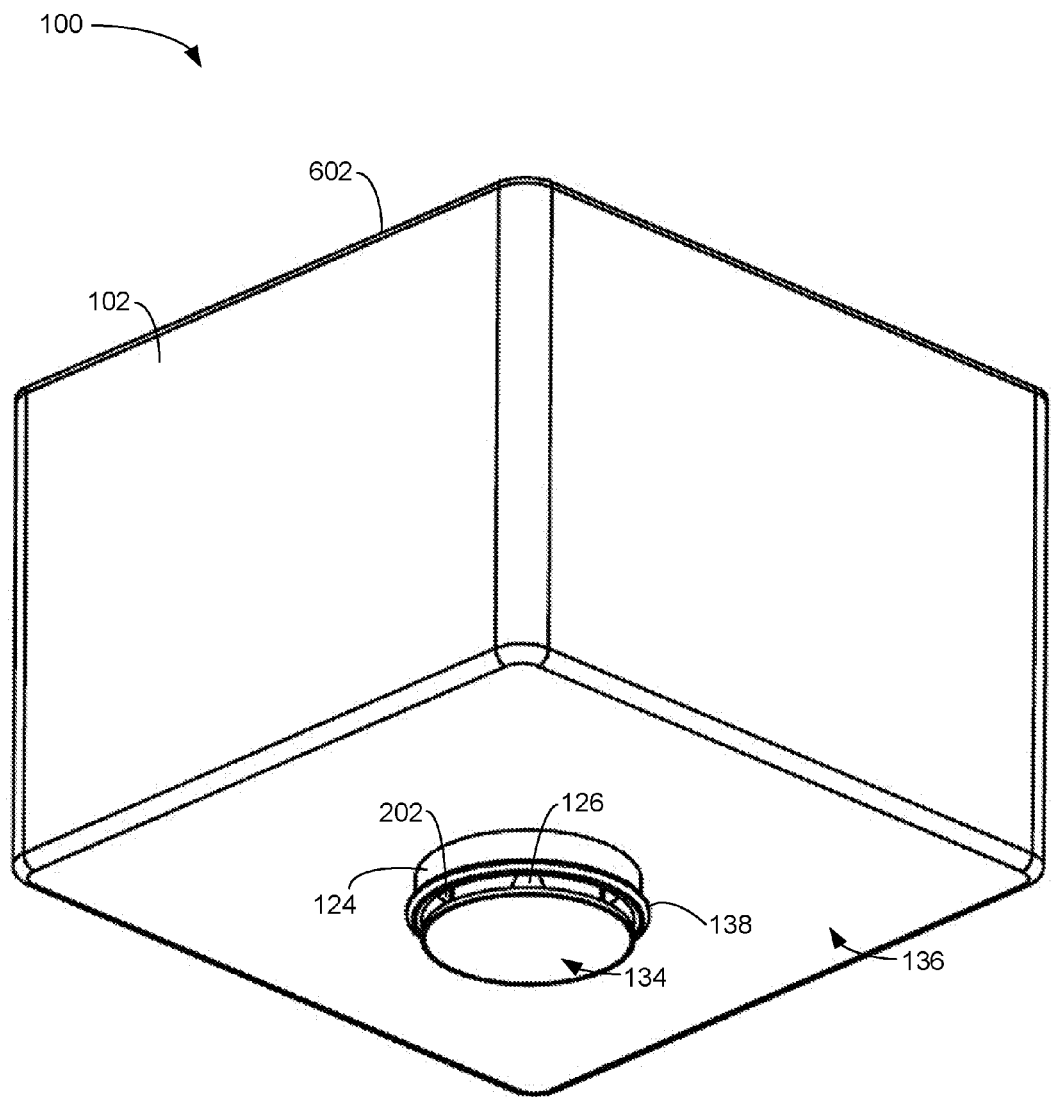
FIG. 7 is a bottom-side perspective wire frame view illustrating the exemplary embodiment of the sleek ceiling speaker system of FIG. 1, according to a preferred embodiment of the present invention.

FIG. 7 is a bottom-side perspective wire frame view illustrating the exemplary embodiment of the sleek ceiling speaker system 100 of FIG. 1, according to a preferred embodiment of the present invention. FIG. 7 illustrates the external appearance of sleek ceiling speaker system 100, with wire frame lines indicating curved edges of housing 102.

Figure 8:
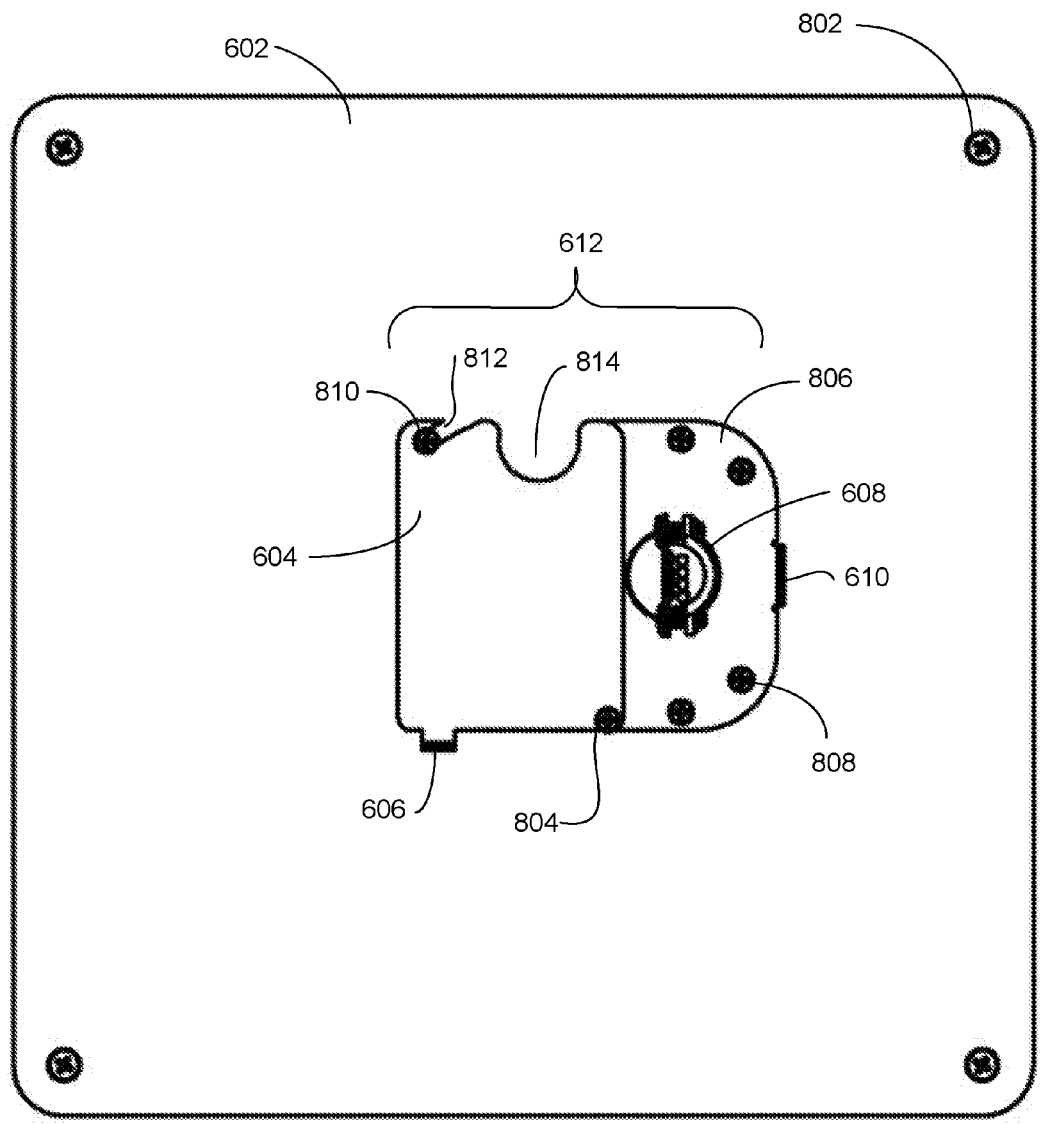
FIG. 8 is a top plan wire frame view illustrating the exemplary embodiment of the sleek ceiling speaker system of FIG. 1, according to a preferred embodiment of the present invention.

FIG. 8 is a top plan wire frame view illustrating the exemplary embodiment of the sleek ceiling speaker system 100 of FIG. 1, according to a preferred embodiment of the present invention. Top panel 602 is secured to housing 102 using fasteners 802. Connector assembly 612 on top panel 602 includes access plate 604 having upward flange 606 and connector plate 806 having cable tie anchor 610 and electrical connector 608 for receiving at least audio signal wires. Connector plate 806 is fastened to top plate 602 by a plurality of fasteners 808 (one of four labeled). Access panel 604 may be removed by removing fastener 804, loosening fastener 810 and, using thumb notch 814 and flange 606, sliding the access plate along an axis of notch 812. Installation of access plate 604 is done by reversing the steps. Access plate 604 enables inspection of the speaker 104 and transformer 128 without disturbing the wiring connections.

Figure 9:
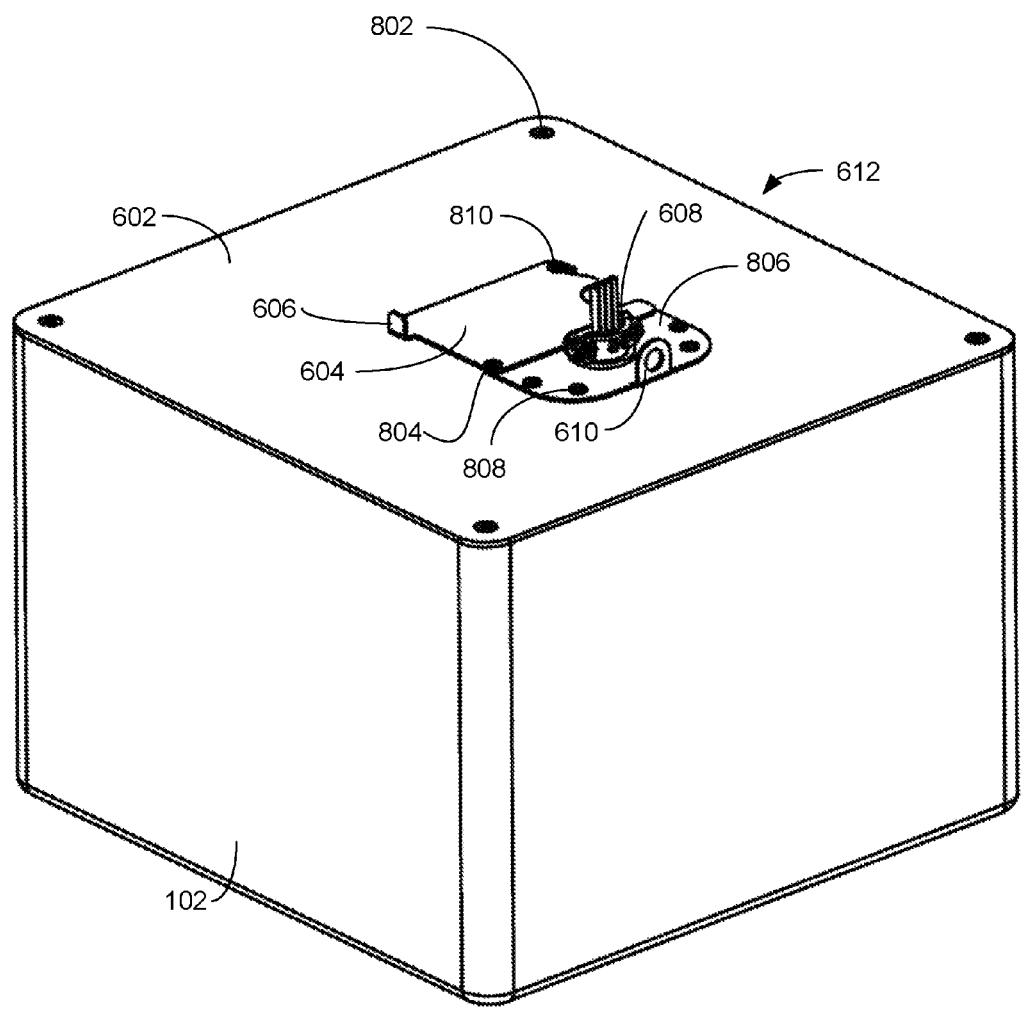
FIG. 9 is a top-side perspective wire frame view illustrating the exemplary embodiment of the sleek ceiling speaker system of FIG. 1, according to a preferred embodiment of the present invention.

FIG. 9 is a top-side perspective wire frame view illustrating the exemplary embodiment of the sleek ceiling speaker system 100 of FIG. 1, according to a preferred embodiment of the present invention. In various embodiments, other shapes for housing 102 may be used, within the constraint of meeting the functional requirements of the invention. In various embodiments, various configurations of the connector assembly 612 may be used, within the constraint of meeting the functional requirements of the invention.

We claim:
1. A sleek ceiling speaker system comprising:
  a. a housing having:
    i. a speaker baffle having a baffle opening for receiving an output end of a speaker; and
    ii. a bottom opening for receiving an end of a sound funnel;
  b. said speaker coupled to a top of said sound baffle around said baffle opening; and
  c. said sound funnel:
    i. having an upper end coupled to a bottom of said sound baffle around said baffle opening; and
    ii. having a lower cylindrical portion extending through said bottom opening; and
  d. an elongated actuator originating from above said speaker and extending through said speaker, through said speaker baffle, into said sound funnel, and terminating in a sound disperser plug.

2. The sleek ceiling speaker system of claim 1, comprising a sound disperser fixed to said lower cylindrical portion of said sound funnel, wherein said sound disperser is adapted to disperse sound radially outwardly over at least 180° around a center of said sound disperser.

3. The sleek ceiling speaker system of claim 1, comprising an LED board supported on said elongated actuator.

4. The sleek ceiling speaker system of claim 3, wherein said elongated actuator comprises a light pipe adapted to receive light from said LED board.

5. The sleek ceiling speaker system of claim 4, wherein said LED board is responsive to an axial rotational position of said elongated actuator to determine the light received by said light pipe.

6. The sleek ceiling speaker system of claim 1, wherein said sound disperser plug comprises one of a transparent plug and a translucent plug.

7. The sleek ceiling speaker system of claim 1, wherein said sound disperser plug comprises a tactile enhancement on a surface thereof.

8. The sleek ceiling speaker system of claim 1, comprising:
  a. a transformer supported on at least one of said sound baffle and said housing; and
  b. a variable transformer tap supported on said elongated actuator and responsive to axial rotation of said elongated actuator to change the volume of sound produced by said speaker during operation.

9. The sleek ceiling speaker system of claim 1, wherein said speaker comprises an open-centered magnetic assembly.

10. The sleek ceiling speaker system of claim 1, wherein said speaker comprises an open-centered dust cap.

11. The sleek ceiling speaker system of claim 1, comprising a releasably attachable outwardly extending circumferential flange adapted to fasten to a bottom end of said sound funnel.

12. The sleek ceiling speaker system of claim 11, comprising a ceiling tile clamped between said releasably attachable outwardly extending circumferential flange and a bottom surface of said housing.

13. A sleek ceiling speaker system comprising:
  a. a housing having:
    i. a speaker baffle having a baffle opening for receiving an output end of a speaker; and
    ii. a bottom opening for receiving an end of a sound funnel;
  b. said speaker coupled to a top of said sound baffle around said baffle opening; and
  c. said sound funnel:
    i. having an upper end coupled to a bottom of said sound baffle around said baffle opening; and
    ii. having a lower cylindrical portion extending through said bottom opening;
  d. an elongated actuator originating from above said speaker and extending through said speaker, through said speaker baffle, into said sound funnel, and terminating in a sound disperser plug; and
  e. a sound disperser fixed to said lower cylindrical portion of said sound funnel, wherein said sound disperser is adapted to disperse sound radially outwardly over at least 180° around a center of said sound disperser.

14. The sleek ceiling speaker system of claim 13, comprising:
  a. an LED board supported on said elongated actuator;
  b. wherein
    i. said elongated actuator comprises a light pipe adapted to receive light from said LED board;
    ii. said LED board is responsive to an axial rotational position of said elongated actuator to determine the light received by said light pipe; and
    iii. said sound disperser plug comprises one of a transparent plug and a translucent plug.

15. The sleek ceiling speaker system of claim 13, wherein said sound disperser plug comprises a tactile enhancement on a bottom surface thereof.

16. The sleek ceiling speaker system of claim 13, comprising:
  a. a transformer supported on at least one of said sound baffle and said housing; and
  b. a variable transformer tap supported on said elongated actuator and responsive to axial rotation of said elongated actuator to change the volume of sound produced by said speaker during operation.

17. The sleek ceiling speaker system of claim 13, wherein said speaker comprises:
  a. an open-centered magnetic assembly; and
  b. an open-centered dust cap.

18. The sleek ceiling speaker system of claim 13, comprising: a releasably attachable outwardly extending circumferential flange adapted to fasten to a bottom end of said sound funnel.

19. A sleek ceiling speaker system comprising:
  a. a housing having:
    i. a speaker baffle having a baffle opening for receiving an output end of a speaker; and
    ii. a bottom opening for receiving an end of a sound funnel;
  b. said speaker coupled to a top of said sound baffle around said baffle opening; and
  c. said sound funnel:
    i. having an upper end coupled to a bottom of said sound baffle around said baffle opening; and
    ii. having a lower cylindrical portion extending through said bottom opening;
  d. an elongated actuator originating from above said speaker and extending through said speaker, through said speaker baffle, into said sound funnel, and terminating in a sound disperser plug;
  e. a sound disperser fixed to said lower cylindrical portion of said sound funnel, wherein said sound disperser is adapted to disperse sound radially outwardly over at least 180° around a center of said sound disperser;
f. a transformer supported on at least one of said sound baffle and said housing;
g. a variable transformer tap supported on said elongated actuator and responsive to axial rotation of said elongated actuator to change the volume of sound produced by said speaker during operation;
h. an open-centered magnetic assembly;
i. an open-centered dust cap;
j. a tactile enhancement on a bottom surface of said sound disperser plug
k. a releasably attachable outwardly extending circumferential flange adapted to fasten to a bottom end of said sound funnel.

20. The sleek ceiling speaker system of claim 19, comprising:
a. an LED board supported on said elongated actuator;
b. wherein
  i. said elongated actuator comprises a light pipe adapted to receive light from said LED board;
  ii. said LED board is responsive to an axial rotational position of said elongated actuator to determine the light received by said light pipe; and
c. said sound disperser plug comprises one of a transparent plug and a translucent plug.

* * * * *